(12) United States Patent
Smith

(10) Patent No.: US 7,073,192 B1
(45) Date of Patent: Jul. 4, 2006

(54) NODE SIZE ESTIMATING TOOL AND METHOD

(75) Inventor: Curtiss Smith, Pennsburg, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/521,770

(22) Filed: Mar. 9, 2000

(51) Int. Cl.
*H04N 7/173* (2006.01)

(52) U.S. Cl. .......................... 725/95; 725/119; 725/106

(58) Field of Classification Search ................ 725/106, 725/95–96, 120, 91, 93, 98, 105, 107, 118–121, 725/127–129, 114, 116; 398/66–73; 379/133, 379/221.07; 709/232–234; 370/468, 486, 370/485, 465
See application file for complete search history.

(56) References Cited

U.S. PATENT DOCUMENTS 5,696,765 A * 12/1997 Safadi ........................ 370/436
6,378,130 B1 * 4/2002 Adams ........................ 725/95
6,425,132 B1 * 7/2002 Chappell ..................... 725/107
6,718,552 B1 * 4/2004 Goode ......................... 725/95

* cited by examiner

*Primary Examiner*—Chris Grant
*Assistant Examiner*—Christopher R Nalevanko
(74) *Attorney, Agent, or Firm*—Lawrence T. Cullen

(57) ABSTRACT

A node size estimation tool for calculating a node size for interactive video, voice or data services placed on a system is provided. The estimation tool includes a computer processor, a data storage device, and the data entry device. Inputs are provided for receiving data on bandwidths for downstream and upstream passbands and for receiving data on node splitting information. Inputs are provided for receiving data on any limitations on the upstream and downstream passbands that are unavailable for use by the system. Inputs are provided for receiving data on requirement information for various services, and for receiving data on estimated service penetration rates, estimated simultaneous use rates, and a desired downstream data rate. Also, inputs are provided for processing data received to calculate the node size. A method of calculating node size utilizing the tool is also provided.

10 Claims, 11 Drawing Sheets

NODE SIZE ESTIMATING TOOL AND METHOD

BACKGROUND

The present invention is directed to a traffic modeling tool for estimating the proper node size for a given number of video, voice and data services on a system, and more particularly, is directed to a tool for estimating a proper optical node size segmentation and for performing "what-if" scenario analyses in connection with node size estimates.

For distributing video, voice and/or data services over a network system, it is necessary to estimate the proper node size (in terms of number of homes passed) for a given number of video, voice and data services. The number of subscribers which can be connected to or supported by a given node is limited based upon the bandwidths used by the system, the available upstream and downstream passbands, the amount of the node splitting and return combining, subscriber data rates and pay load data rates, as well as simultaneous use rates. This is further complicated by a need to run cables for services in areas which have a low initial subscriber rate, but which have a potential for attracting additional subscribers in time. This can be estimated in terms of penetration rates for each of the services offered which can be set based upon previous experience or other factors so that the number of homes passed per node is not initially underestimated based only upon the low initial subscriber rates.

In the past, the estimation of a required node size was typically a "seat-of-the-pants" guesstimate, or was calculated by hand to a rough order of magnitude. There was also no expedient way for calculating "what-if" scenarios to determine the effect of changes in certain variables such as penetration rates in determining the number of subscribers which an optical node can or could support in the future.

It would be desirable to provide an estimation tool which would allow the estimation of an appropriate node size given certain known parameters regarding the types of services to be placed on the system.

SUMMARY

Briefly stated, the present invention provides a method of estimating a node size for a system offering at least one of a plurality of services requiring transmission of data to a subscriber. The method is carried out utilizing a node size estimation computer program in a computer and comprises:

(a) inputting system bandwidths for at least one of downstream and upstream passbands into a system bandwidth field in the computer;

(b) inputting node splitting information on a number of nodes per transmitter that will share the same services into node splitting and return combining information fields in the computer;

(c) inputting any limitations on the downstream and upstream passbands that are unavailable for use by the system into an unavailable bandwidth field in the computer;

(d) inputting requirement information for services including at least one of analog broadcasts, digital broadcasts, polled access/control, cable modem, telephony, interactive video and video on demand services, including at least one of a required channel width and channel quantity for at least one of downstream and upstream services, the type of data modulation, and payload data rate per channel to be utilized into service table fields for each of the services;

(e) inputting at least one of an estimated service penetration rate for homes passed that will subscribe to each of the services, an estimated simultaneous use rate, and a desired downstream data rate to be received by each subscriber into a respective field for each of the services in the computer;

(f) calculating the node size required using the computer program with data input in steps (a)–(e); and (g) outputting a recommended number of homes passed per node.

In another aspect, the present invention provides a node size estimation tool for calculating a node size for at least one of interactive video, voice or data services placed on a system. The estimation tool comprises a computer processor and a data storage device in communication with the computer processor. A data entry device is provided in communication with the computer processor and the data storage device. First means are provided for receiving data on bandwidths for the downstream and upstream passbands. Second means are provided for receiving data on node splitting information on a number of nodes per transmitter that will share the same services. Third means are provided for receiving data on any limitations on the upstream and downstream passbands that are unavailable for use by the system. Fourth means are provided for receiving data on requirement information for services including at least one of analog broadcasts, digital broadcasts, polled access/control, cable modem, telephony, interactive video and video on demand services, including at least one of a required channel width and channel quantity for upstream and downstream service, and the type of data modulation and payload data rate per channel to be utilized. Fifth means are provided for receiving data on at least one of estimated service penetration rates for homes passed that will subscribe to each of the services, estimated simultaneous use rates, and a desired downstream data rate to be received by each subscriber. Sixth means are provided for processing the data received in the first through fifth data receiving means to calculate the node size for the system.

BRIEF DESCRIPTION OF THE DRAWINGS

The foregoing summary, as well as the following detailed description of the preferred embodiments of the invention will be better understood when read in conjunction with the appended drawings. For the purposes of illustrating the invention, there is shown in the drawings embodiments which are presently preferred. It should be understood, however, that the invention is not limited to precise arrangements shown. In the drawings.

DETAILED DESCRIPTION OF THE PREFERRED EMBODIMENT

Figure 1:
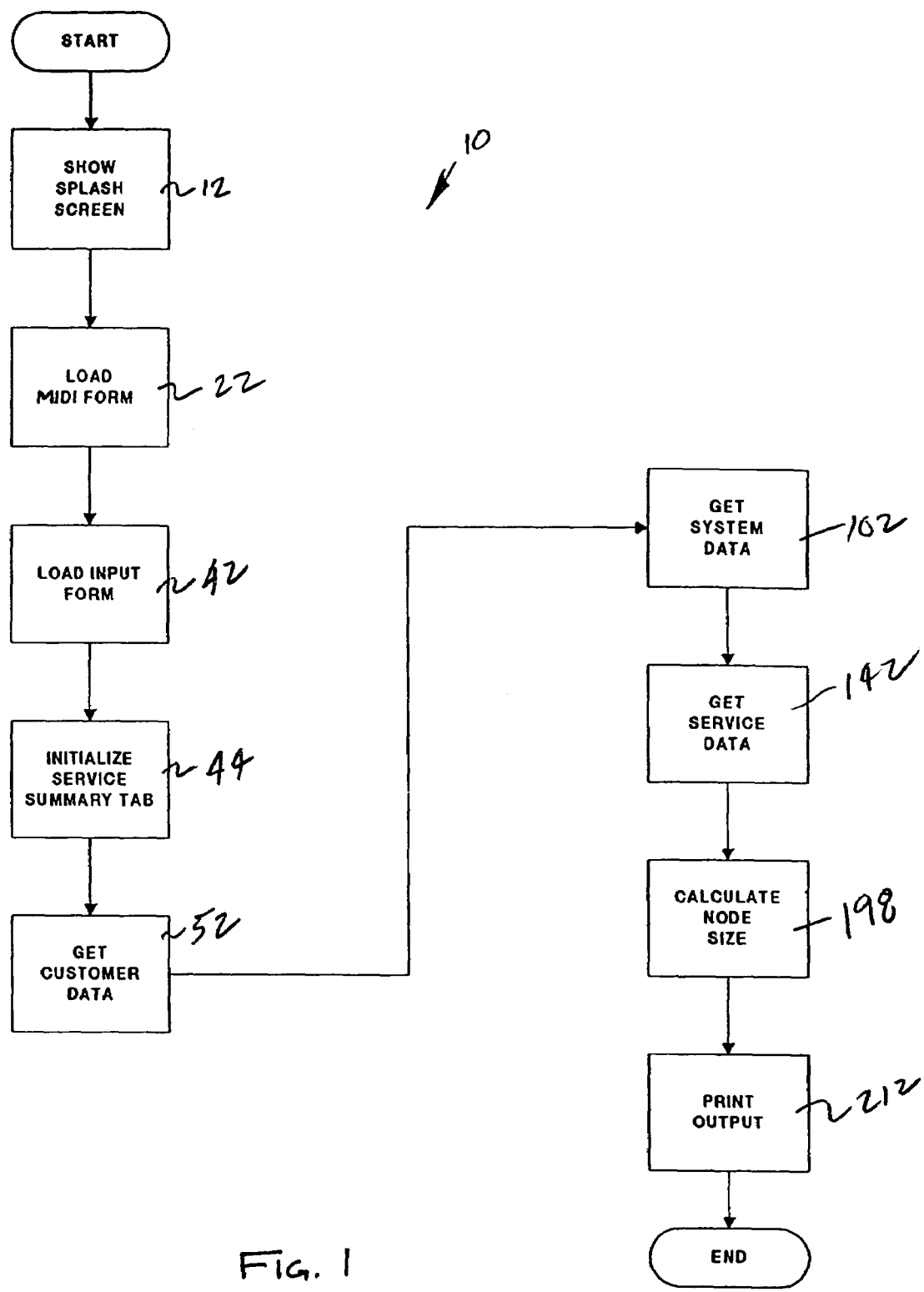
FIG. 1 is a flow chart for the node size estimating tool in accordance with the present invention.

Certain terminology is used in the following description for convenience only and is not considered limiting. The words "right", "left", "lower", and "upper" designate directions in the drawings to which reference is made. This terminology includes the words specifically noted above, derivatives thereof and words of similar import. Additionally, the terms "a" and "one" are defined as including one or more of a referenced item unless specifically noted.

Referring to the drawings, wherein like numerals designate like elements throughout, there is shown in FIGS. 1–8 flow charts for the software utilized in the node size estimating tool 10 for calculating a node size for at least one a video, voice and data services placed on a network system. The estimating tool 10 comprises software as explained in detail below which is installed on a computer, such as a PC, which includes a computer processor and a data storage device in communication with the computer processor. Preferably, the processor is a Pentium processor. However, it will be recognized by those skilled in the art from the present disclosure that other processors can be utilized, if desired. The data storage device preferably comprises both random access memory (RAM) and a hard drive. In a preferred embodiment, at least sixteen megabytes of RAM are provided and at least twenty megabytes of memory are available on the hard drive.

Figure 2:
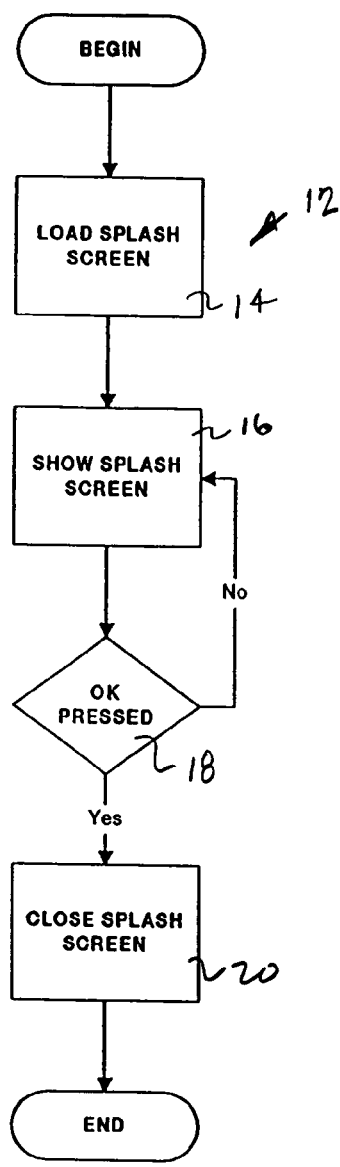
FIG. 2 is a flow chart of the software for showing the splash screen for the node size estimating tool in accordance with the present invention shown in FIG. 1.

The estimating tool 10 for calculating a node size in accordance with the present invention is preferably provided as a computer program which is loaded into the PC in the known manner. As shown in FIGS. 1 and 2, in order to start using the system 10 a splash screen is shown on the PC monitor. As shown in FIG. 2, this is accomplished by the computer loading the splash screen data, shown in box 14, from the data storage device and displaying the splash screen on the monitor as shown in box 16. A user then indicates whether they wish to proceed, as shown at box 18, which closes the splash screen, as shown in box 20, and initiates the program.

Figure 3:
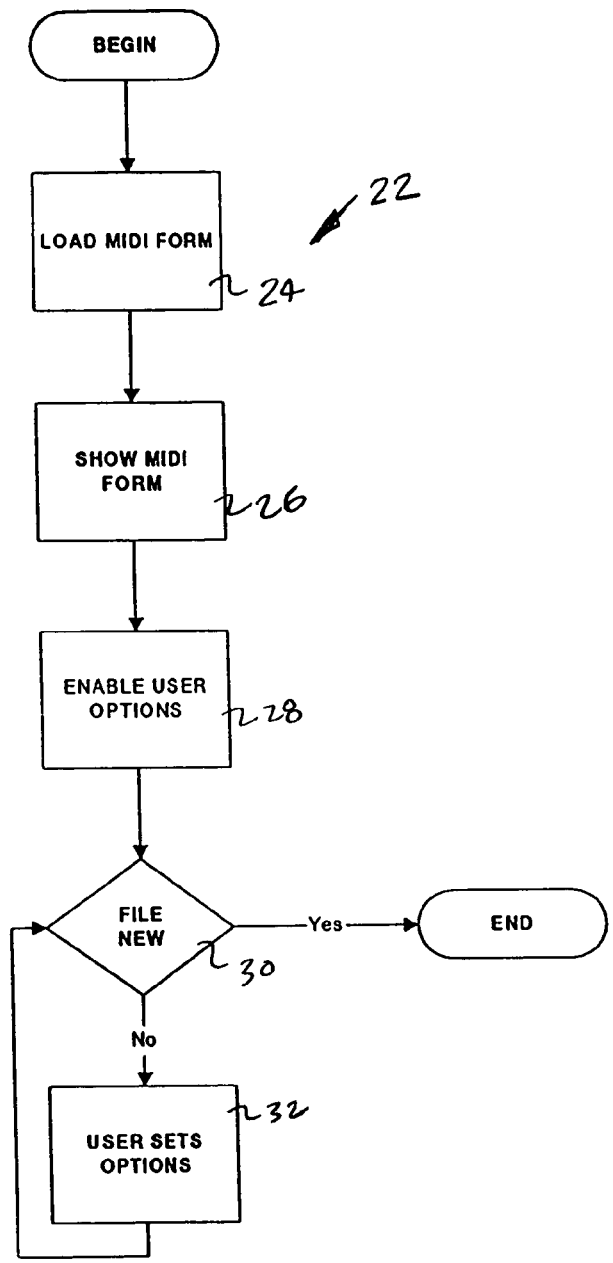
FIG. 3 is a flow chart of the software for loading the MIDI form for the node size estimating tool in accordance with the present invention shown in FIG. 1.

As shown in FIGS. 1 and 3, when the program has been initiated in the computer, the MIDI form is loaded, as shown by box 22 in FIG. 1 and in detail in FIG. 3. The MIDI form is loaded from the data storage device, as shown in box 24, and is then displayed on the monitor, as shown in box 26. The processor enables user options, as shown in box 28, which can be set as shown in boxes 30 and 32 prior to ending the subroutine.

Figure 4:
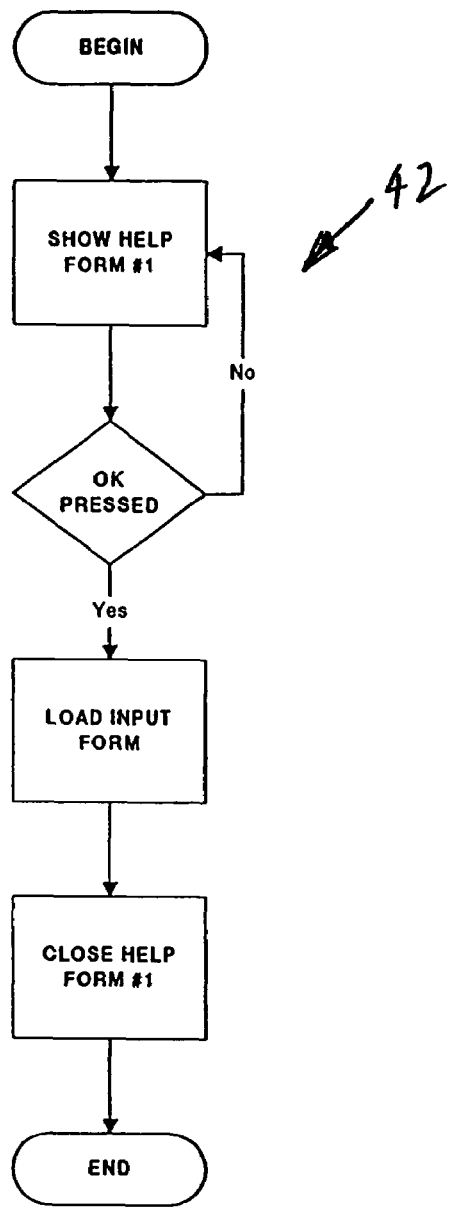
FIG. 4 is a flow chart of the software for loading the input form for the node size estimating tool in accordance with the present invention shown in FIG. 1.
Figure 5:
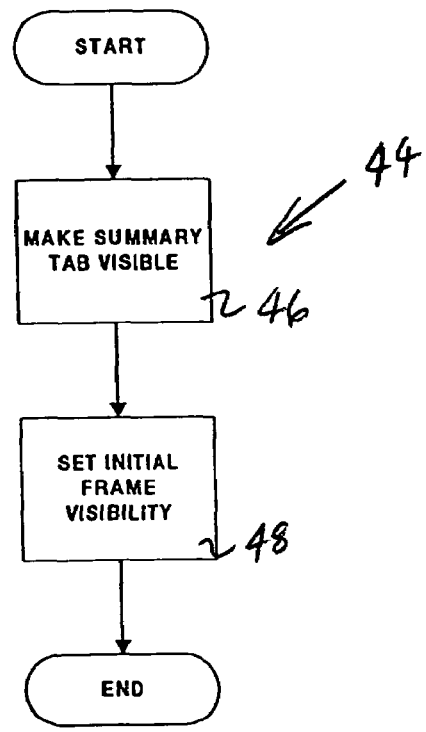
FIG. 5 is a flow chart of the software for making the summary table visible for the node size estimating tool in accordance with the present invention shown in FIG. 1.
Figure 6:
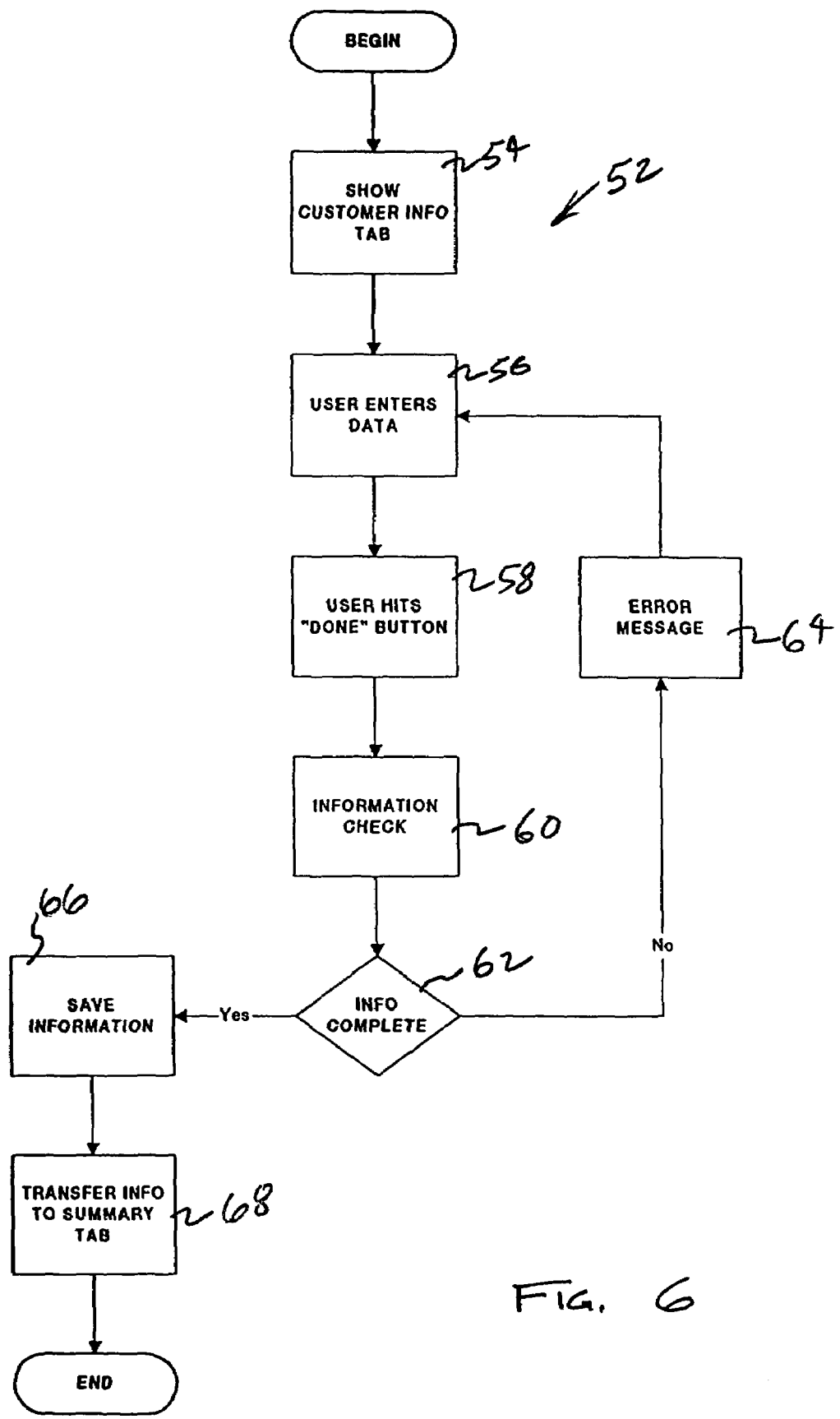
FIG. 6 is a flow chart of the software for getting customer data for the node size estimating tool in accordance with the present invention shown in FIG. 1.

As shown in FIGS. 1 and 4, the input form is then loaded by the computer, as shown in box 42. Next, the service summary table is initialized as shown by box 44 in FIG. 1 and in detail in FIG. 5. This includes making the summary table visible and setting the initial frame visibility as shown in boxes 46 and 48 in FIG. 5.

Figure 9:
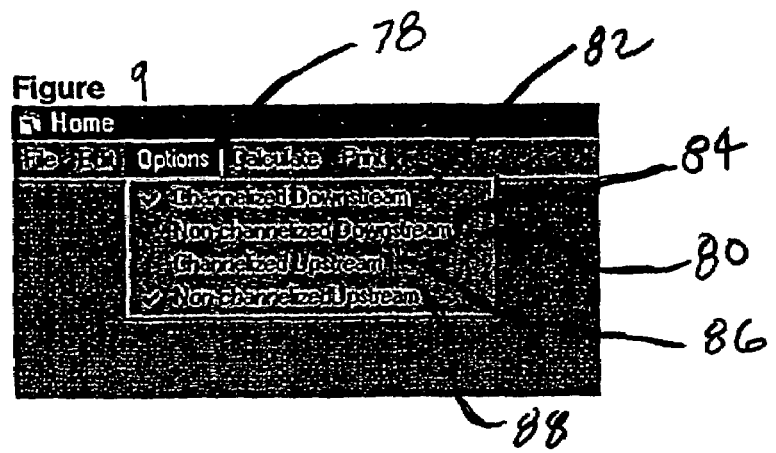
FIG. 9 shows a preferred start menu screen used in conjunction with the software in accordance with the present invention which illustrates the channelized and non-channelized downstream and upstream options.

Prior to entering customer information, two additional options may be selected. As shown in FIG. 9, a user may click on the options menu bar at 78 which reveals a drop down menu 80. By clicking on the option desired, the tool 10 will perform calculations based on a channelized or non-channelized upstream and/or downstream format. This option remains in effect until changed, or until a model is exited and reopened. The "channelized downstream" option 82 may be checked if the model is to be treated with the available bandwidth in defined channels. A prompt for the channel size is issued when the calculation sequence has begun, as explained in detail below. A default entry is typically provided for the channel width of 6 MHZ. For example, if there is 200 MHZ of bandwidth for interactive services, the full 200 MHZ cannot be used in a channelized format. Only 198 MHZ would be available (200/6 equals 33.333; 33*6=198). It is also possible to have multiple "service channels" within individual 6 MHZ channels. If the "non-channelized downstream" option 84 is selected, the system will use the entire available bandwidth in its calculations. For example, if 200 MHZ of bandwidth is available, the entire 200 MHZ would be used based on the assumption that the bandwidth can be dynamically allocated to maximize the bandwidth use efficiency. The same approach applies to the upstream path as well and a channelized upstream option 86 may be selected or a non-channelized upstream option 88 may also be selected.

Figure 10:
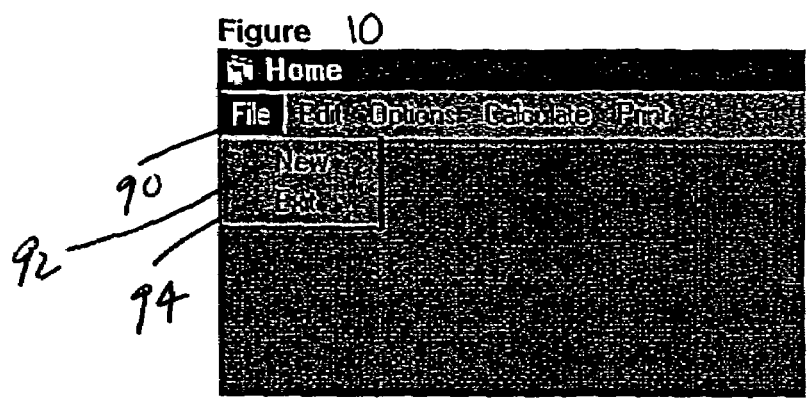
FIG. 10 is a view of the preferred start menu screen shown in FIG. 9 showing the file options for opening a new file or exiting the program.

Referring to FIG. 10, the screen for starting and exiting a model is shown. By clicking on the file menu 90, a drop down menu opens. By clicking the "New" option 92, the input forms are opened to begin a new model. These input forms are used to input the data required for the model. To exit the model, user clicks on the "Exit" option 94 of drop down menu. This closes all open forms and exits the program. A "Save" option may also be provided in order to save models, if desired. In the event that a "Save" option is not provided, the output for any model calculated by the tool 10 should be printed since the information would not otherwise be saved upon exiting the tool 10.

Figure 1A:
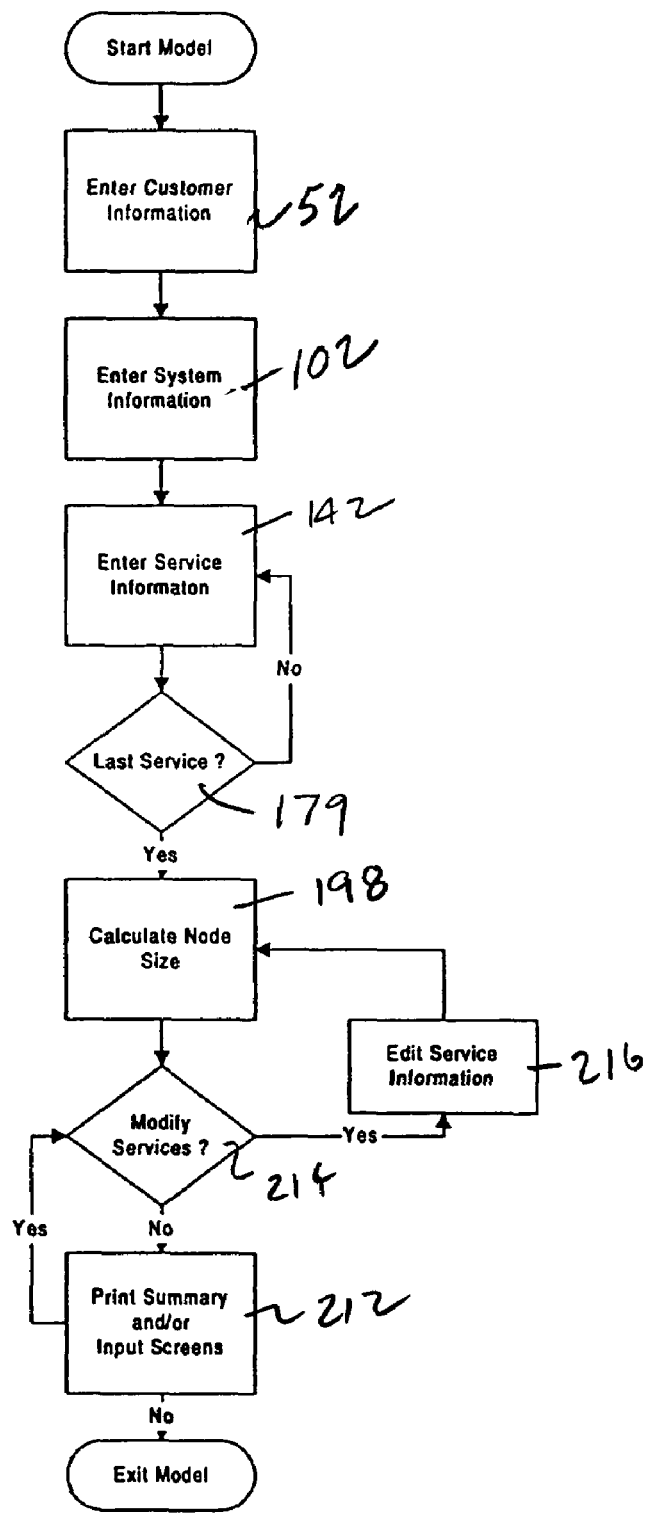
Figure 11:
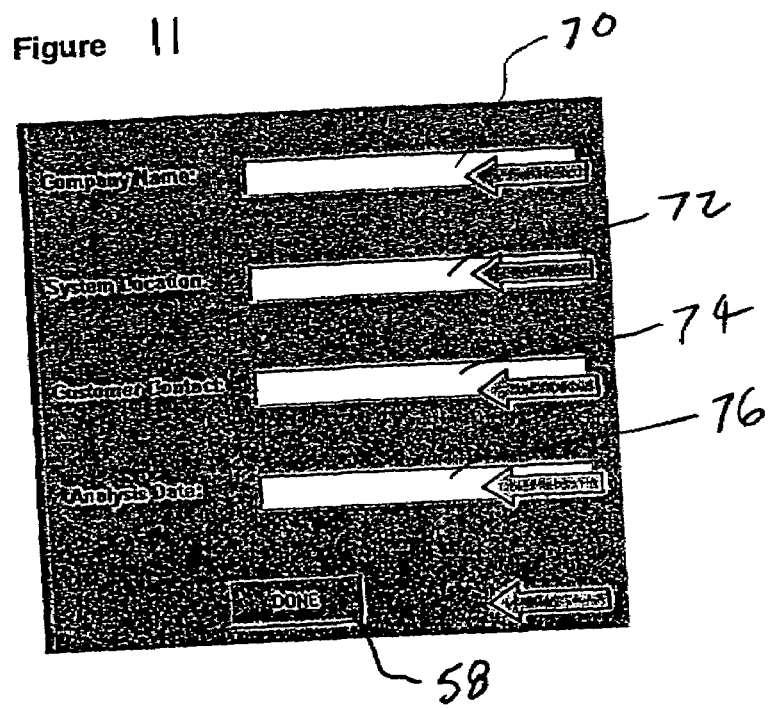
FIG. 11 is a view of a preferred screen format for entering customer information for the node size estimating tool in accordance with the present invention.

The estimating tool 10 next looks for customer data as shown in box 52 in FIG. 1. As shown in detail in FIG. 6, a customer information table is displayed as shown in box 54, and the user then enters data in the entry fields provided, as shown in box 56. The user then hits a "Done" button, as shown by box 58, and the estimating tool 10 then checks to make sure that the information entered is complete, as shown in boxes 60 and 62. If the information is not complete, an error message is displayed, as shown in box 64, so that the user can enter the complete or corrected information. If the information is complete, the information is then saved, as shown in box 66, and is then transferred to the summary table, as shown in box 68. The user action required to enter the customer information is also shown in FIG. 1a as box 52. A preferred screen display for entering the customer information is shown in FIG. 11, wherein the company name can be entered at field 70, the system location can be entered at field 72, the customer contact can be entered at field 74, and the analysis date is entered at field 76. The "Done" button 58 is then actuated by the user.

Figure 7:
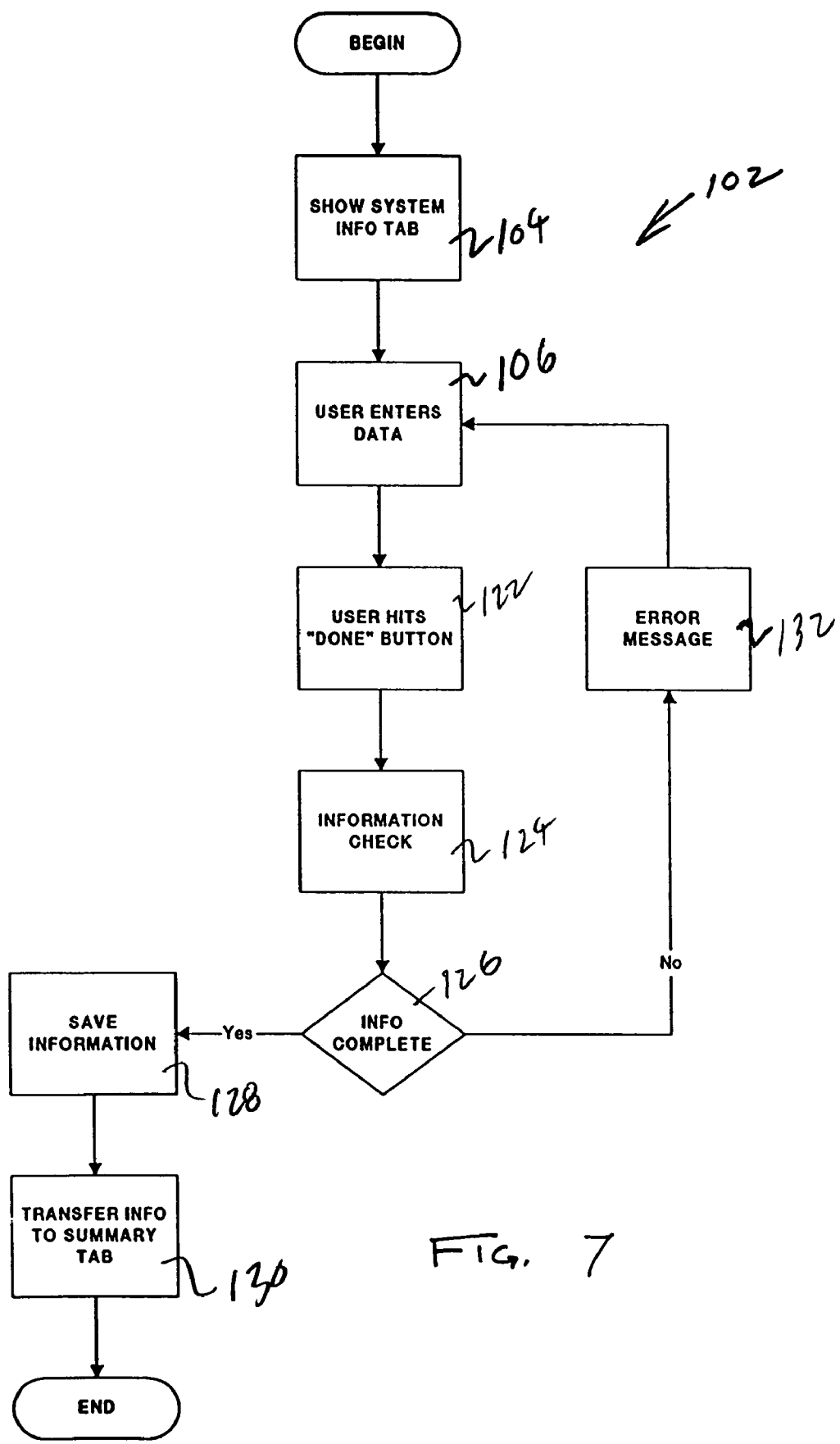
FIG. 7 is a flow chart for the software for getting system data for the node size estimating tool in accordance with the present invention shown in FIG. 1.

Referring again to FIG. 1, the estimating tool 10 next requests system data for the network system for which the node is being calculated. The program logic flow for inputting the system data is shown in FIG. 7 and the input fields for the system information table are shown in a preferred screen layout in FIG. 12. Referring to FIG. 7, the system information table is displayed by the tool 10, as shown in box 104. The user then enters system data, as shown in box 106. Examples of the types of data entered are shown in detail in the preferred embodiment of a screen format shown in FIG. 12. In box 110, downstream bandwidth information is entered. This concerns the frequency passband that will be assigned for forward transmission (downstream) of the systems services. As shown in box 110, a lower limit of the forward or downstream passband of 50 MHZ has been entered in field 110a. The upper limit of the forward or downstream passband of 750 MHZ has also been entered in field 110b. The upper limit is usually the upper limit of the operating bandwidth of the equipment in the system network. Downstream passbands typically have a lower limit of between 47 and 85 MHZ and an upper limit of 750 or 870 MHZ. However, those skilled in the art will recognize that the upper and lower limits can be adjusted based upon the equipment provided for the system.

Figure 12:
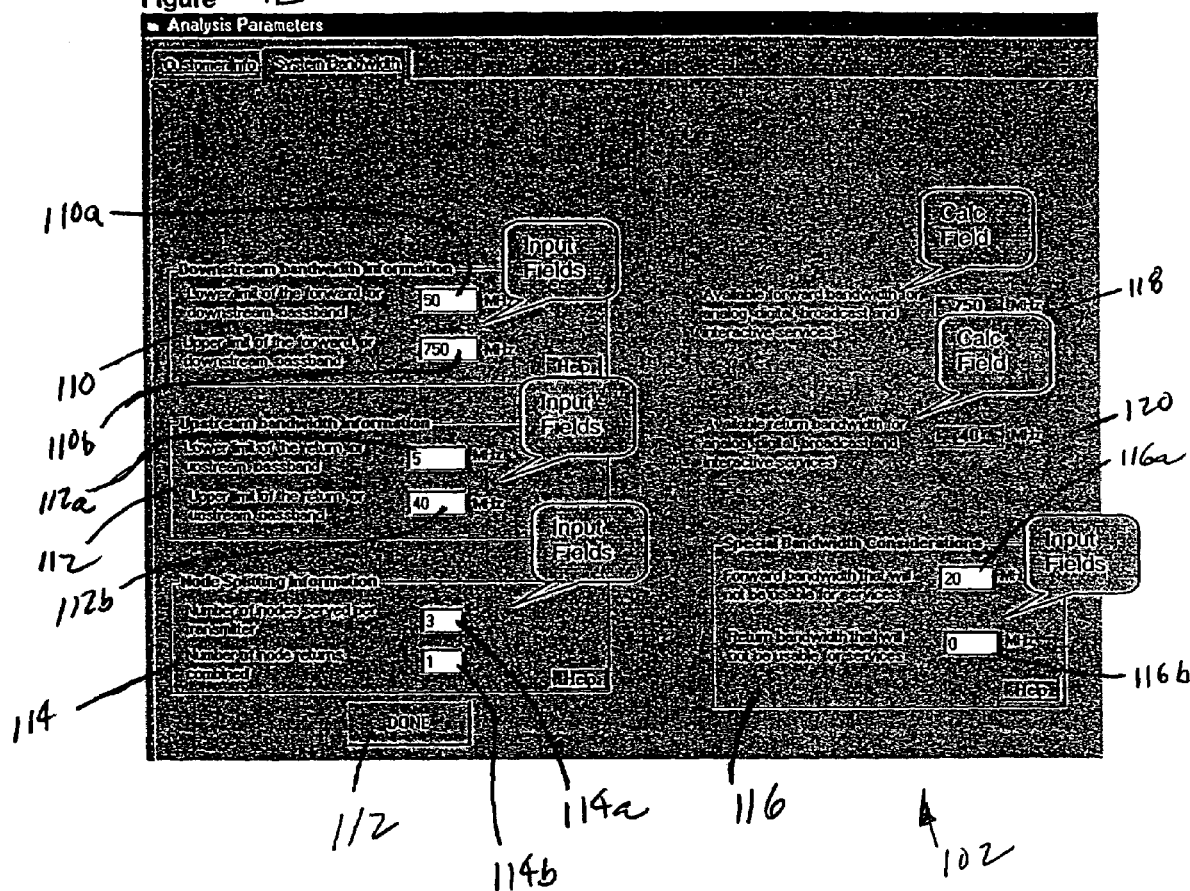
FIG. 12 is a view of a preferred screen format for loading system bandwidth information and assumptions utilized in calculating the node size for the node size estimating tool in accordance with the present invention.

Still with reference to FIG. 12, a second box 112 is provided for inputting upstream bandwidth information. This input area concerns the frequency passband that will be assigned for return transmission (upstream) of the system services. A lower limit of the return or upstream passband is entered in field 112a, which can be for example (5 MHz). The upper limit of the return or upstream passband is entered in field 112b, and can be for example 40 MHZ. Typically, the lower limit for most network equipment for the upstream passband is 5 MHZ, the upper limit is generally between 30 and 65 MHZ, depending upon the equipment selected. However, those skilled in the art will recognize from the present disclosure that the upstream and downstream limits can be set to any available range, as desired.

Still with reference to FIG. 12, node splitting information is entered into input area 114. Node splitting information concerns the number of nodes that will be sharing the same services. This is primarily related to the targeted or narrow cased interactive services. The number of nodes indicated in the nodes per transmitter field 114a share the downstream bandwidth dedicated to interactive services. For example, in the example shown, three nodes are shared in the downstream bandwidth. The number of nodes indicated in the node returns field 114b are the number of nodes which share the upstream interactive bandwidth. In the example shown, only one node shares the upstream interactive bandwidth.

Still with reference to FIG. 12, an input table 116 for special bandwidth considerations is shown. This allows a user to input any forward bandwidth that will not be useable for services in field 116a and any return bandwidth that will not be useable for services in field 116b. Reasons that this would be applicable are the desire not to include certain portions of the passbands in the calculations. For example, many systems do not use the FM band (88–108 MHz). If these bandwidth ranges are not used, the model should not assume that they are available. The entries are representative of the unavailable bandwidth segments and not bandwidth of the network being modeled.

Two calculation fields are shown at 118 and 120. The available forward bandwidth for analog, digital, broadcast and interactive services is shown in box 118 and the available return bandwidth for analog, digital, broadcast and interactive services is shown in box 120.

Once the user enters the data, the user then clicks on the "Done" button 122 as shown in FIG. 12 and FIG. 7. The node sizing tool 10 then checks the information for completeness at box 124 in FIG. 7. If the information is complete, as shown in box 126, the information is saved, as shown in box 128, and is transferred to the information summary table 130. If the information is not complete, an error message is generated, as shown in box 132, and the user is required to correct the data.

Figure 8:
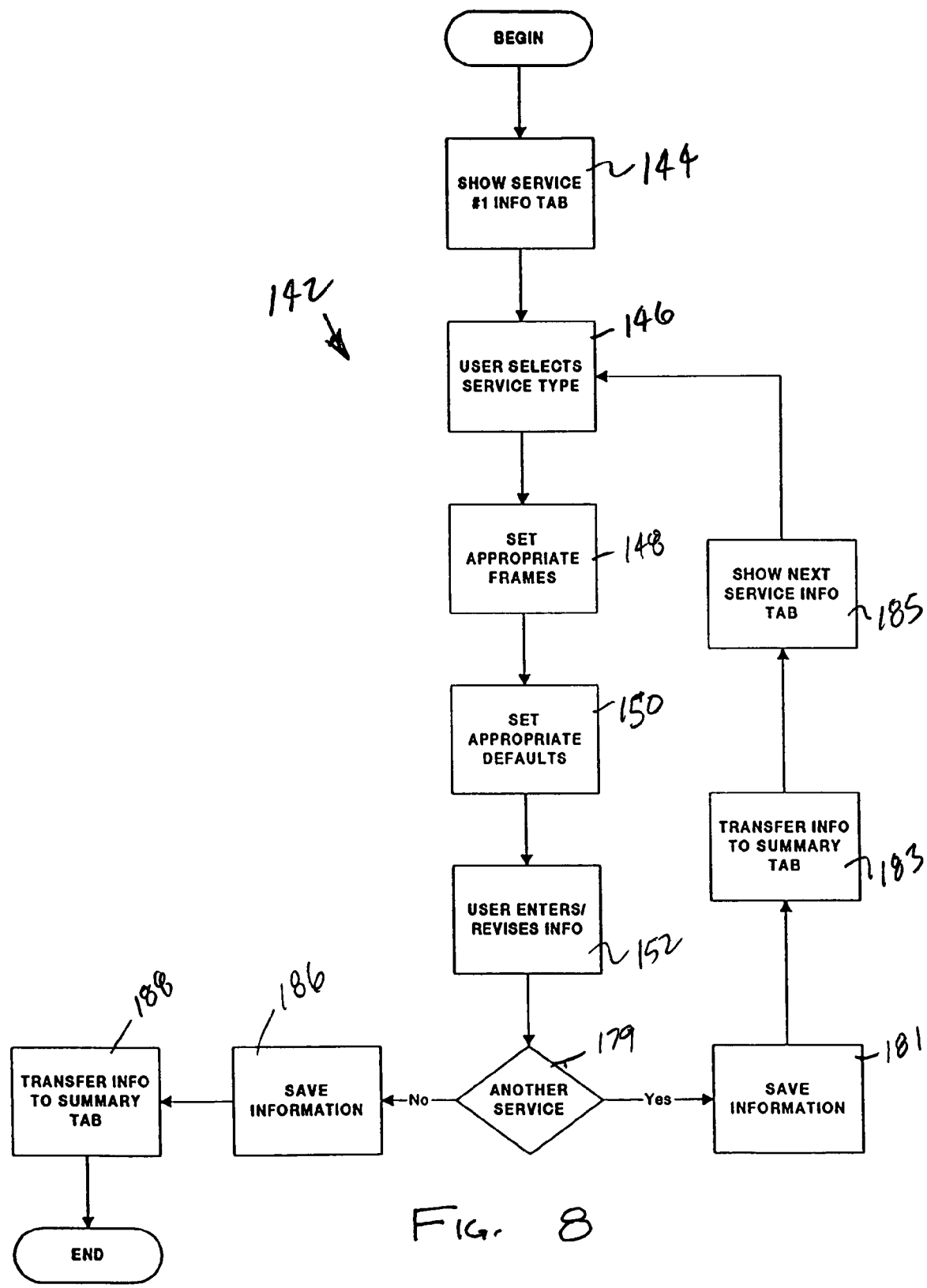
FIG. 8 is a flow chart of the software for getting the service data for the node size estimating tool in accordance with the present invention shown in FIG. 1.

Next, the network system service data is entered, as shown in box 142 in FIG. 1. The entry of service information is shown in detail in FIG. 8 and by a preferred screen for inputting service information data, shown in FIG. 13. As shown in FIG. 8, the system 10 displays the "service #1" information table as shown by box 144. The user then selects the service type, as shown by box 146 in FIG. 8 which corresponds to the service type selection box 146 in FIG. 13. The user first selects the type of service, which can be any one of analog, broadcast, digital broadcast, polled access/control, cable, modem, telephony, interactive video and/or video on demand. This prompts the estimating tool 10 to show the appropriate fields along with a set of default values for the fields, if appropriate. Currently, if data is entered into a field prior to choosing the service type, it will be overwritten by the default value and will need to be entered again. However, those skilled in the art will recognize that this is not required and can be changed. Analog broadcast refers to analog signals delivered to all subscribers, and includes signals from satellite and locally received signals. Digital broadcast includes digital signals delivered to all subscribers. Generally these are QAM modulated signals from satellites. Polled access/control signals are control signals associated with different applications such as status monitoring and set-top control. Cable modem provides high speed data services to cable modems. Telephony refers to HFC or IP based telephone services using the HFC plant. Interactive video provides services that have features such as user defined camera views, interactive advertising, etc. Video on demand refers to video services where subscribers can access and control video screens on a real-time basis.

Once the first service to be input has been selected, as shown in box 146, the tool 10 sets the appropriate frames and sets the appropriate defaults, as shown in boxes 148 and 150 in FIG. 8. The user then enters and/or revises information in the appropriate fields, as shown in box 152. These can include downstream service information, as shown in box 154. Some fields may not be visible based upon the service type chosen. However, generally channel width of a single service channel including guard bands is inputted in the channel width field 154a, and the number of channels for the service is input in the channel quantity field at 154b. The bandwidth required is calculated and displayed in field 154c based upon the information in fields 154a and 154b. Upstream service information is entered in box 156. The channel width for upstream service is entered in field 156a, including the width required for guard bands. The channel quantity for the upstream service is entered in field 156b with the number of channels per service. The bandwidth required is calculated and shown in the calculation field 156c by the tool 10.

The downstream data modulation scheme for downstream transmission is then entered in box 158 and the upstream data modulation scheme that will be used for upstream transmission is entered in box 160. The options are defined as FSK for Frequency Shift Keying; QPSK for Quadrature Phase Shift Keying; 16 QAM for Quadrature Amplitude Modulation with a constellation of 16 states; 64 QAM for Quadrature Amplitude Modulation with a constellation of 64 states; 256 QAM for a Quadrature Amplitude Modulation with a constellation of 256 states; or any other user defined modulation scheme. The downstream and upstream payload data rates per channel are then entered in boxes 162 and 164 for the service. The data rate is dependent upon the modulation scheme used and channel width of the service in the downstream or upstream directions, respectively. The following table illustrates the typical values associated channel widths and data payload rates:

| Modulation Scheme | "Typical" Channel width (MHZ) | Approximate Payload data rate (Mb/s) |
|---|---|---|
| FSK | 0.300 | 0.18 |
| QPSK | 1.5 MHz | 2 |
| 16 QAM | 1.5 MHz | 4 |
| 64 QAM | 6 MHz | 27 |
| 256 QAM | 6 MHz | 38 |

The service penetration rate is also entered in box 166. At this point, there are no industry standard percentages for individual services. However, broadcast penetration is usually near 65% of the homes passed. Penetration rates for other services will vary widely from area to area and system to system and must be estimated conservatively based upon the information available. The service penetration rate is defined as the percentage of homes passed that will subscribe to this service, and is likely to be different for each type of service.

Figure 13:
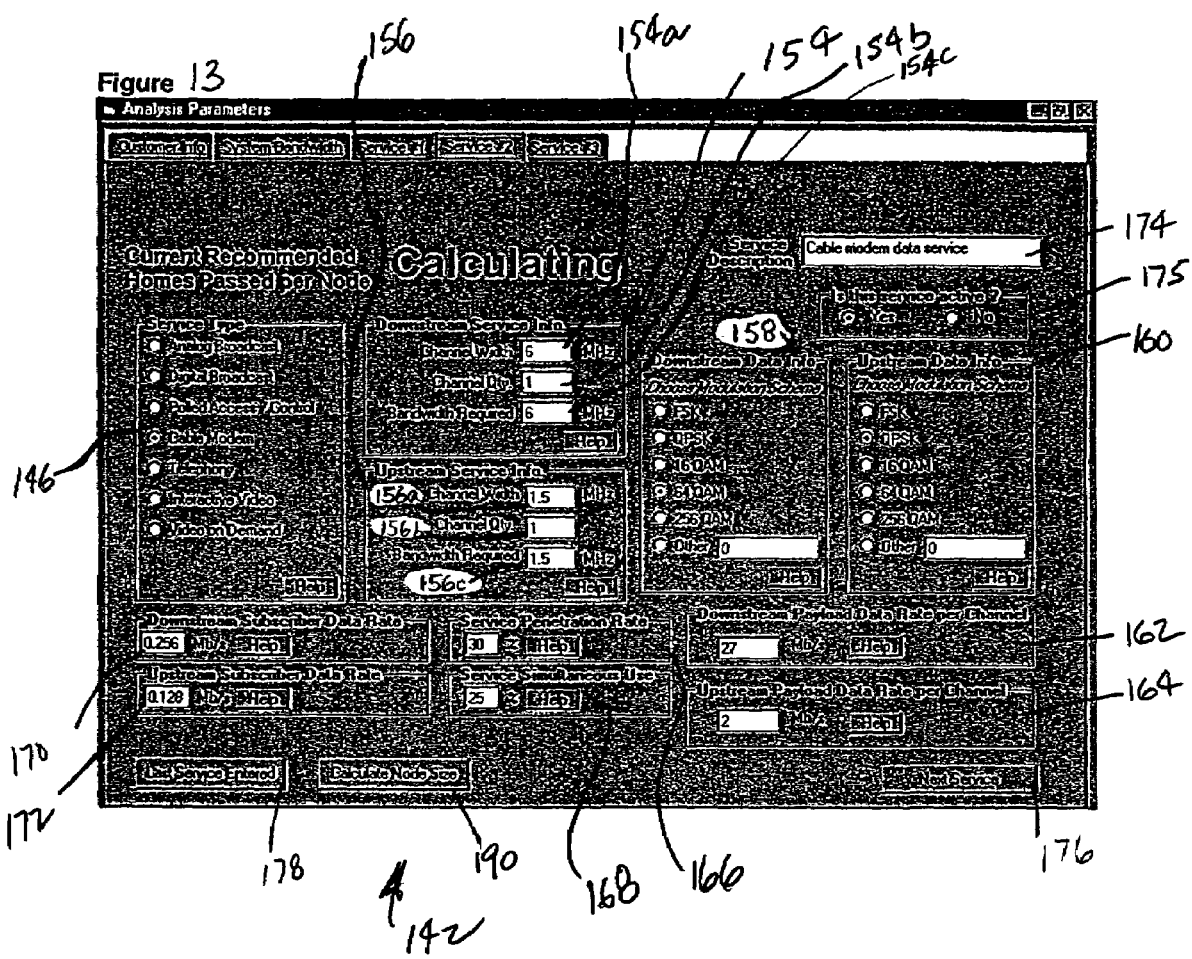
FIG. 13 is a view of a preferred screen used for entering service information for the different types of services to be carried by the system for the node size estimating tool in accordance with the present invention.

Still with reference to FIG. 13, the service simultaneous use rate can be entered in data field 168. Again, there are no industry standard percentages for individual services. Broadcast simultaneous use is usually set at 100%. Usage rates for other services will also vary widely from area to area. Simultaneous use is defined as percentage of subscribers that will be using the service at the same time.

The downstream subscriber data rate is entered in field 170. This provides the tool 10 with the downstream data rate that will be delivered to the subscriber for each service. If the service is broadcast or polled-data, this frame will not be visible. The number entered here will be used along with the simultaneous use and service data rates to determine bandwidth required for the service at different node sizes. The downstream subscriber data rate is defined as the downstream data rate in Mb/s, that each user will receive.

Still with reference to FIG. 13, an upstream subscriber data rate can be entered in field 172. This provides the upstream data rate that will be delivered to the subscriber for each service. Again, if the service type is broadcast or polled-data, this frame will not be visible. The number entered here is used along with the simultaneous use and service data rates to determine bandwidth required for the service at different node sizes. Again, the data rate is defined as the upstream data rate, in Mb/s, that each user will receive.

Still with reference to FIG. 13, a service description field 174 is shown that allows the user to customize the name given to a specific service. By default, the name of the service type chosen is displayed. This information is also displayed by the tool 10 on the service summary form. In order to provide different estimates, a service option can be removed from the calculation of node size in box 175 by a user selecting the "No" option such that the tool 10 ignores the particular service's bandwidth requirements in the calculations. To reactivate the service for the node size estimate, the "Yes" option is selected.

After the correct information is entered for the selected service, the user can select the "Next Service" button 176 if additional services are to be included in the estimate. However, if the data entered was for the last service to be entered, the user can click the "Last Service Entered" button 178 in order to calculate the node size. The computer logic flow for this is illustrated in detail in FIG. 8. At box 179, the determination is made on whether another service will be added. If another service is added, the information for the present service is saved in the data's storage device, as shown at box 181, and the information is transferred to the summary table in the data storage device, as shown in box 183. The next service information table is then shown as illustrated by box 185 and the user may select a different service type from box 146 and proceeds through the process of inputting additional data on the next service. Once the last service has been entered, the user chooses the "Last Service Entered" button 178 and the information is saved, as shown in box 186. The information is then transferred to the summary table, as shown by box 188. The user then clicks the "Calculate Node Size" button 190, as shown in FIG. 13 which appears next to the "Last Service Entered" button 178.

Figure 14:
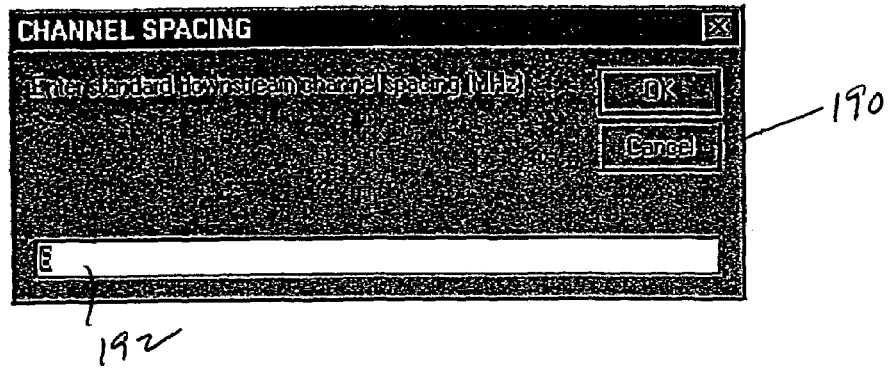
FIG. 14 is a view of a preferred screen for entering the channel spacing options for the node size estimating tool in accordance with the present invention.

If one of the channelized options is set, a small input screen will then be generated. This is shown in detail in FIG. 14. The screen will prompt the user to enter downstream or upstream channel spacing for the bandwidth area where the interactive services will reside. This is the standard spectrum channel spacing. For instance, if the system is based on NTSC, then the downstream channel spacing will be 6 MHz. PAL systems have a different spacing depending on the formatting frequency. Two screens will appear if both upstream and downstream passbands are channelized. When the channel spacing is entered and the "ok" is clicked, the tool 10 will begin calculating the node size, as shown in box 198 in FIGS. 1 and 1A.

The tool 10 calculates the node size by determining the available frequency spectrum available in both the upstream and downstream paths using the passband information entered into the tool 10. The non-dynamic service bandwidth requirements are subtracted from the available bandwidth. Examples of these non-dynamic services are broadcast services in the downstream direction and polled services in the upstream and downstream passbands. The services have a dedicated bandwidth that is used 100% of the time. The remaining bandwidth is available for interactive or dynamic services. This bandwidth is then divided by the amount of node splitting and return combining indicated in the system information at fields 114a and 114b to arrive at the available bandwidth per node. Using the interactive service information entered, including the subscriber data rates 170 and 172 and payload data rates 162 and 162, the tool 10 calculates the amount of subscribers that can be simultaneously supported in that service's channel. Once this information is known, the model then uses the other parameters from the services including the penetration rates 166 and the simultaneous use rates 168 along with the interactive bandwidth available to determine the node size. The tool 10 initially starts with a large number of homes passed per node that is an overestimate, which can be based upon a network maximum. The penetration and simultaneous use rates 166, 168 are then used to determine the number of people simultaneously using each service. Once this number has been determined, it is divided by the users per service channel in order to determine how many service channels are required. This number is then multiplied by the bandwidth required for each service channel in order to arrive at a total interactive bandwidth required for each service with the given node size. This required bandwidth is then compared with the available interactive bandwidth. If there is not enough bandwidth available, the number of homes passed is iteratively reduced and the process is repeated. These calculations are done separately for both the upstream and downstream passbands. The tool 10 then compares the results for the both upstream and downstream passbands that satisfy the available bandwidth and displays the lower number. The constraining passband is also shown so that the user knows whether the system is upstream limited or downstream limited.

Figure 15:
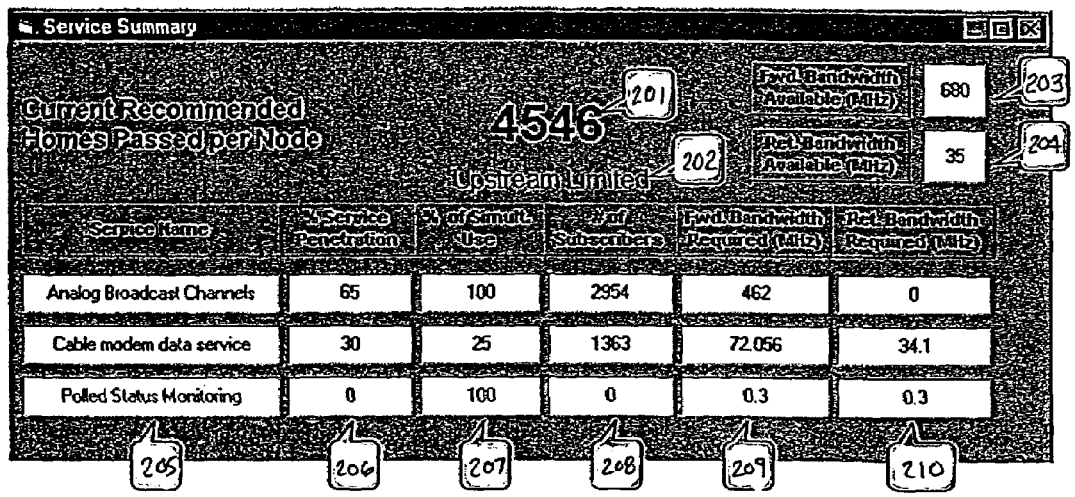
FIG. 15 is a view of a preferred service summary screen for the node size estimating tool in accordance with the present invention.

When the tool 10 has completed calculating the node size, two actions occur. A window entitled "Service Summary" is generated on the monitor, as shown in FIG. 15. This contains summary information on the services that were entered and the node size calculated. Additionally, the text "Calculating" shown above the downstream services information in FIG. 13 will change to the "Calculated Node Size." While a preferred embodiment of the service summary information window is shown in FIG. 15, it will be recognized by those skilled in the art from the present disclosure that other window arrangements could be utilized if desired. The service summary screen 200 shows the calculated maximum node size at 201 based upon the services the user entered. It also shows what passband is constricting the node size. For example, as shown at 202 the upstream passband limited the node size in the present case to 4546 homes passed per node. This means that there was not enough upstream bandwidth to support additional users at the given penetration and simultaneous use rates for the selected services for more than the number of homes indicated. The amount of downstream bandwidth available is shown in box 203 and the amount of upstream bandwidth available is shown in box 204.

Figure 16:
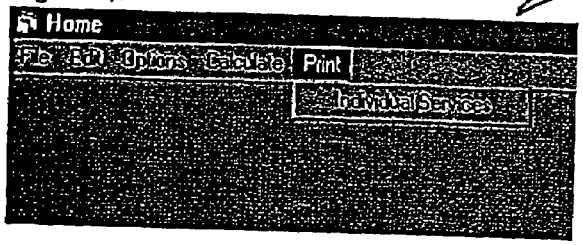
FIG. 16 is a view of a preferred screen for printing the input information as well as the service summary information calculated by the node size estimating tool in accordance with the present invention.

The service description column 205 shows the data from the service entry tables for the services used in the estimate. The service penetration rate column 206 illustrates the service penetration rates for each service. The simultaneous use rates are illustrated in column 207 and are also provided from the service entry table for each service. The number of subscribers for each service based upon the calculated maximum node size is shown in column 208. The number of users who are on simultaneously can be calculated by applying the simultaneous use percentage. Column 209 illustrates the downstream bandwidth required for supporting the services per node, given the service parameters. Summing this column gives the amount of bandwidth required at an instant in time. The upstream bandwidth required for supporting the services per node is shown in column 210. Summing this column gives the amount of bandwidth required an instant in time for the upstream bandwidth. The output can be printed as shown in box 212 in FIG. 1 using the print option. A preferred screen for the printing function is shown in FIG. 16. However, those skilled in the art will recognize from the present disclosure that the screen format can be varied, as desired.

As shown in FIG. 1A, it is also possible after calculating the node size, as shown by box 198, to modify the services as shown by box 214. If the services are to be modified to run "what if" scenarios, the service information can be edited, such as by turning off a selected service at the active service selection in box 175 in FIG. 13. The service information can also be edited, as indicated by box 216 in FIG. 1A, and the calculation of the node size rerun for the different scenarios. The selected services can also be edited by changing channel widths, payload data rates, subscriber data rates, service penetration rates, service simultaneous use rates, system bandwidth assumptions and/or node splitting parameters. This allows a user to compare the results when various parameters are changed.

In the present working embodiment of the tool 10, each configuration must be printed in order to maintain a record of the original configuration. However, those skilled in the art will recognize from the present disclosure that the tool 10 can have the capability of saving estimates using different configurations such that prior estimates can be recalled and modified, if desired.

While the preferred embodiment of the invention has been described in detail, the invention is not limited to the specific embodiments or preferred screen arrangements described above which should be considered as merely exemplary. Further modifications and extensions of the present invention may be developed, and all such modifications are deemed to be within the scope and spirit of the present invention as defined by the appended claims and all legal equivalents thereto.

What is claimed is:

1. Method of estimating a node size for a system offering at least one of a plurality of services requiring transmission of data to a subscriber, the method utilizing a computer program in a computer and comprising:

(a) inputting system bandwidths for at least one of downstream and upstream passbands into a system bandwidth field in the computer;

(b) inputting node splitting information on a number of nodes per transmitter that will share the same services into node splitting and return combining information fields in the computer;

(c) inputting any limitations on the downstream and upstream passbands that are unavailable for use by the system into an unavailable bandwidth field in the computer;

(d) inputting requirement information for services including at least one of analog broadcasts, digital broadcasts, polled access/control, cable modem, telephony, interactive video and video on demand services, including at least one of a required channel width and channel quantity for at least one of downstream and upstream services, and the type of data modulation and payload data rate per channel to be utilized into service table fields for each of the services;

(e) inputting estimated service penetration rates for homes passed that will subscribe to each of the services, estimated simultaneous use rates, and a desired downstream data rate to be received by each subscriber into respective fields for each of the services in the computer;

(f) calculating the node size required using the computer program with data input in steps (a)–(e); and (g) outputting a recommended number of homes passed per node.

2. Method of claim 1 wherein system bandwidths, limitations and requirement information for services for both the downstream and upstream passbands are input in the computer.

3. Method of claim 2 wherein calculating the node size further comprises:

subtracting unavailable upstream and downstream passbands from the input system bandwidths to determine an available interactive bandwidth;

dividing the available interactive bandwidth by the number of nodes per transmitter entered in the node splitting and return combining information fields for the downstream and upstream passbands respectively to determine an available bandwidth per node for the downstream and upstream passbands;

calculating the amount of subscribers that can be simultaneously supported for each service based on subscriber data rates and payload data rates;

calculating the node size utilizing the penetration rate, the simultaneous use rate and the available bandwidth per node for each of the upstream and downstream bandwidth passbands by:

(i) starting with an overestimate of number of homes passed per node, (ii) using the penetration rates and the simultaneous use rates to determine a number of subscribers simultaneously using each service, (iii) dividing the number of subscribers simultaneously using each service by a number of subscribers per service channel to determine a required number of service channels, (iv) multiplying the number of service channels required by the bandwidth required for each service channel to determine a total interactive bandwidth required, and (v) comparing the total required interactive bandwidth with the available interactive bandwidth and if the total required interactive bandwidth is greater than the available interactive bandwidth, iteratively reducing the number of homes passed and repeating the calculation of steps (ii) to (iv) until the total required interactive bandwidth is less than or equal to the available interactive bandwidth to determine a maximum number of homes passed per node; and comparing the maximum number of homes passed per node for the upstream and downstream bandwidth passbands and reporting a lower of these numbers.

4. Method of claim 2 further comprising:

determining whether the upstream or downstream passband is constricting the node size; and outputting a report of the passband that is constricting the node size.

5. Method of claim 1 further comprising entering identifier information into an identifier information table in the computer for a desired node size estimation.

6. Method of claim 5 wherein the identifier information includes a customer name and a customer contact.

7. Method of claim 1 further comprising:

initially selecting one of a channelized and a non-channelized format for at least one of the upstream bandpass and the downstream bandpass; and calculating a channelized bandpass available bandwidth when the channelized format is selected.

8. Method of claim 1 further comprising:

providing a menu driven graphical user interface for inputting data.

9. Method of claim 1 further comprising providing default values for at least one of the fields based on a computer program provider's equipment.

10. Estimating tool for calculating a node size for at least one of interactive video, voice or data services placed on a network, comprising:

a computer processor and a data storage device in communication with the computer processor;

a data entry device in communication with the computer processor and the data storage device;

first means for receiving data on bandwidths for downstream and upstream passbands;

second means for receiving data on node splitting information on a number of nodes per transmitter that will share the same services;

third means for receiving data on any limitations on the upstream and downstream passbands that are unavailable for use by the system;

fourth means for receiving data on requirement information for services including at least one of analog broadcasts, digital broadcasts, polled access/control, cable modem, telephony, interactive video and video on demand services, including at least one of a required channel width and channel quantity for upstream and downstream service, and the type of data modulation and payload data rate per channel to be utilized;

fifth means for receiving data on estimated service penetration rates for homes passed that will subscribe to each of the services, estimated simultaneous use rates, and a desired downstream data rate to be received by each subscriber;

sixth means for processing the data received in the first through fifth data receiving means to calculate the node size for the network node.

* * * * *